United States Patent

Estkowski et al.

Patent Number: 5,226,739
Date of Patent: Jul. 13, 1993

[54] INTEGRAL RETAINER AND BEARING ASSEMBLY

[75] Inventors: Michael H. Estkowski, St. Joseph; Christopher G. Estkowski, Coloma, both of Mich.

[73] Assignee: Shepherd Products U.S., Inc., St. Joseph, Mich.

[21] Appl. No.: 747,351

[22] Filed: Aug. 20, 1991

Related U.S. Application Data

[62] Division of Ser. No. 634,443, Dec. 27, 1990, Pat. No. 5,068,943.

[51] Int. Cl.⁵ .................. F16C 43/04; F16C 32/00
[52] U.S. Cl. ........................... 16/46; 384/448
[58] Field of Search .............. 16/46; 384/560, 448, 384/492, 510, 909; 29/413, 898.06, 898.065, 898.066, 898.067

[56] References Cited

U.S. PATENT DOCUMENTS

| | | |
|---|---|---|
| 760,264 | 5/1904 | Slick ................. 29/898.065 |
| 3,141,711 | 7/1964 | Biedinger . |
| 3,177,516 | 4/1965 | Price et al. . |
| 3,186,025 | 6/1965 | Kesterton . |
| 3,239,291 | 3/1966 | Batt ................... 384/560 |
| 3,243,194 | 3/1966 | Trusock . |
| 3,892,447 | 7/1975 | Gruber et al. . |
| 3,920,293 | 11/1975 | Takeuchi . |
| 3,991,434 | 11/1976 | James . |
| 4,069,543 | 1/1978 | James . |
| 4,432,659 | 2/1984 | Tuckey . |
| 4,603,982 | 8/1986 | Dittrich . |
| 4,752,986 | 6/1988 | Rivkin et al. . |
| 4,911,269 | 3/1990 | Perl . |
| 5,022,768 | 6/1991 | Baxter ................. 384/19 |
| 5,046,248 | 9/1991 | Lederman ............. 29/413 |

Primary Examiner—John Sipos
Assistant Examiner—Carmine Cuda
Attorney, Agent, or Firm—Lee, Mann, Smith, McWilliams, Sweeney & Ohlson

[57] ABSTRACT

A retainer and bearing assembly in which the bearing members are formed as an integral component of, and are initially connected to the retainer, for separation upon assembly or use.

3 Claims, 1 Drawing Sheet

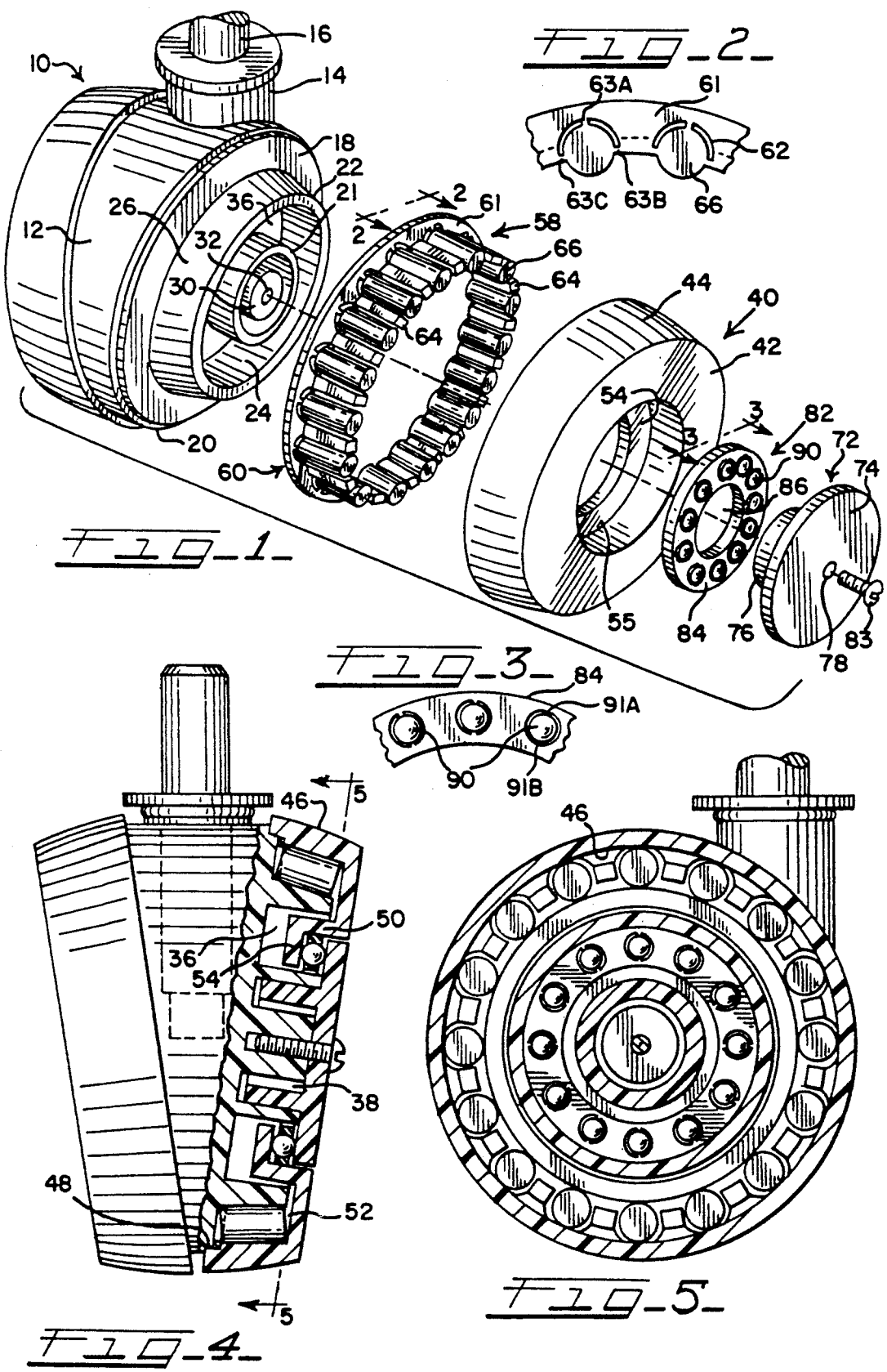

5,226,739

INTEGRAL RETAINER AND BEARING ASSEMBLY

RELATED APPLICATIONS

This application is a division of U.S. patent application Ser. No. 07/634,443, filed Dec. 27, 1990, now U.S. Pat. No. 5,068,943.

BACKGROUND OF THE INVENTION

The present invention is directed to a dual wheel tilted axle caster with an integral retainer and bearing assembly. Prior art patents which show various caster features include U.S. Pat. Nos. 3,141,711, 3,177,516, 3,186,065, 3,892,447, 3,920,293, 3,991,434, 4,069,543, 4,432,659, 4,603,982, 4,752,986 and 4,911,269. None of these patents disclose the combined features of the present invention.

SUMMARY OF THE INVENTION

The present invention is directed to a dual-wheel tilted axle caster which incorporates an integrally formed bearing and retainer assembly. The caster includes a body with a pair of angularly inclined side walls which converge toward each other at the lower end of the body. First and second cylindrical sleeves extend outwardly from each of the side walls. The integrally formed bearing and retainer assemblies are of two types. The tapered roller bearing arrangement includes a cage with a generally circular configuration and includes pegs connected to the cage to space a plurality of individual tapered roller bearings from each other. The bearing members are molded integrally with the cage member and are releasably connected to the cage member for ease of assembly. A wheel is mounted overlying each bearing and cage assembly. A cover secures the wheel to the body. Disposed between each wheel and wheel cover is a ball bearing assembly in which the support ring and the balls are initially formed as an integral unit. When the wheels and bearings are assembled and the wheels rotated the ball bearings twist and sever their connection to the support ring. The tapered bearings separate from the cage during assembly thereby rotatably supporting the wheels for rotation relative to the caster body.

BRIEF DESCRIPTION OF THE DRAWINGS

FIG. 1 is an exploded perspective view of the present invention.

FIG. 2 is a cross-section of the cage and bearing assembly shown in FIG. 1 taken along lines 2—2.

FIG. 3 is a cross-section of the ball bearing assembly shown in FIG. 1 taken along lines 3—3.

FIG. 4 is a front view in partial section of the present invention.

FIG. 5 is a cross-sectional view taken along lines 5—5 shown in FIG. 4.

DETAILED DESCRIPTION OF THE INVENTION

As illustrated in Figures one through five a dual wheel tilted axle caster, generally designated by the numeral 10, includes an integrally molded body 12 which may be made of plastic or other suitable material. A socket 14 is provided at the upper portion of the body 12 and is adapted to receive a vertically-disposed swivel stem 16 to secure the caster 10 to the underside of a chair leg, chair base, table leg or similar structure. Since each side of the caster 10 is a mirror image of the other, only one side will be described, with the understanding that the description applies equally to both sides.

The body 12 is generally circular in configuration and defines a pair of angularly inclined side walls 18. As best shown in FIG. 4, the side walls 18 converge toward each other at the lower end of the body 12. An included angle of approximately nine degrees is formed between a vertical plane which bisects the body and stem and a plane which is tangent to the surface of a side wall 18. Each side wall 18 is provided with a recess 20 about its periphery. A first integral cylindrical sleeve 21 extends outwardly from the side wall 18 and is coaxial therewith and extends perpendicular thereto. A second cylindrical sleeve 22 is coaxial with and extends from each side wall 18, said sleeve 22 being spaced radially outwardly from said sleeve 21. The sleeve 22 defines an inner peripheral surface 24 which extends outwardly from the side wall 18 at a right angle and an outer peripheral surface 26 which extends outwardly in tapered relation to the inner surface 24, such that, as best shown in FIG. 4, the base of sleeve 22 is thicker than the outer edge. The outer peripheral surface 26 acts as an inner race for a bearing assembly as will be described in greater detail.

A boss 30 is centrally disposed on and extends outwardly from and perpendicular to the side wall 18 of the caster body 12. A threaded bore 32 is centrally disposed in the boss 30. A first annular chamber 36 is defined between the sleeves 21 and 22 and a second annular chamber 38 is defined between the sleeve 21 and the boss 30.

A pair of wheels 40 are provided for rotation relative to the body 12. Each wheel 40 defines an outer face 42. An annular spherical surface in the form of a rim 44 extends inwardly from the outer face 42 to provide full contact with the surface upon which the caster 10 is rolled. The two wheels 40 combine to present a rolling surface which approximates a sphere to the flooring or carpet on which the caster rolls. The rim 44 includes an inner surface 46 which includes a peripheral groove 48.

A cylindrical wall 50, best shown in FIG. 4, extends inwardly from the outer face 42 defining an annular chamber 52 between it and the inner surface 46 of the rim 44. An annular flange 54 extends inwardly from the wall 50 at a right angle thereto. The flange 54 is disposed within the first recess 36 with the wall 50 adjacent the inner surface 24 of the sleeve 22. The wall 50 and flange 54 combine to form a recess 55 in the outer face 42 of the wheel 40.

As best shown in FIGS. 1 and 2, an integrally formed bearing and retainer assembly, generally designated by the numeral 58, is provided for use in the dual wheel caster. The bearing and retainer assembly is a unique arrangement which is molded as an integral plastic unit. This allows for bearing assemblies to be manufactured and inventoried in this form without the need for separate parts and greatly simplifies caster assembly.

A circular cage member 60 including a flange 61 is sized to fit about the base of the outer surface 26 of the sleeve 22. As best seen in FIG. 2, the flange 61 includes a plurality of arcuate openings 62. Three thin connector arms 63A, 63B and 63C connect individual tapered roller bearings 66 to the flange 61. Outwardly-extending pegs 64 are disposed between each pair of bearings 66 and are integrally formed with the flange 61. The flange 61 of cage 60 is cleared and covered by peripheral groove 48 of wheel 40.

A wheel cover generally designated as 72 is shown in FIG. 1. The wheel cover 72 includes a plate 74 sized to fit within the recess 55 in the wheel 40. A cylindrical plug member 76 extends from the plate 74 and is sized to be received within the annular recess 38. An aperture 78 is centrally disposed through the cover plate 74. A screw 80, inserted through the aperture 78 and threaded into the bore 32, secures the wheel 40 to the caster body 12 while allowing for relative rotation therebetween.

An integrally formed ball bearing assembly 82 is provided which includes a bearing support ring 84 disposed between the flange 54 and the plate 74. The support ring 84 defines a central opening 86. As best shown in FIG. 3 a plurality of ball bearings 90 are disposed within the support ring 84. Each ball 90 is initially connected to support ring 84 by plastic fingers 91A and 91B which position and maintain the balls 90 relative to the ring 84 until the caster is put into operation.

Assembly and operation of the caster 10 will now be explained. The bearing and cage assembly 58 is positioned as a unit into the wheel recess 52. The wheel 40 and bearing and cage assembly 58 are then positioned over the surface 26 of the sleeve 22. As the cage member 60 with bearings in place is moved toward its operative position with the flange 61 against the side wall 18 the bearings 66 are forced radially outwardly by tapered surface 26. As the wheel is positioned over the bearing assembly and the inner end of the tapered surface 46 approaches the side wall 18 the inner end of bearings 66 are forced inwardly so as to sever the connections 63A, B and C with the cage. This structural relationship and assembly procedure allows the roller bearings 66 and the spacers 64 to be molded in line with the axis of the rollers. This results in a roller bearing 60 with no parting line on its peripheral surface. This is most important since these rollers bear most of the load on their surface and a smooth surface is essential for acceptable operation. When assembled, the rollers are separated from the cage and are ready for use.

The integral ball bearing assembly 82 is then placed adjacent the flange 54. The wheel cover 72 is secured to the boss 30 by screw 80 to secure the wheel 40 to the body 12. The ball bearing assembly 82 permits the wheel 40 to rotate with respect to the body 12. As soon as the wheel 40 is rotated the individual ball bearings 90 rotate between surfaces of flange 54 and plate 74. Rotation of the bearings 90 fractures the thin connector arms 91A and 91B which connect the bearings to the ring thereby allowing free rotation of the bearings.

The dual canted wheels 40 present a spherical contact surface to the surface upon which the caster is rolled which is much like the surface contact presented by a caster having a ball surface. This reduces swivel effort. Since the body 12 is formed as a single unit and the roller bearing and cage assembly 58 is integrally formed and the ball bearing assembly 82 is integrally formed caster assembly may be accomplished quickly, easily and inexpensively.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. An integrally formed bearing and retainer assembly including a retainer member having an annular flange and a plurality of pegs, each said peg including a first end connected to said flange and a second unconnected end, said pegs being spaced apart from one another and extending generally perpendicular to said flange;

a plurality of bearing members molded integrally with and connected to said flange of said retainer member, said bearing members adapted to engage an inner bearing race and an outer bearing race, each said bearing member extending perpendicularly from said flange and located between adjacent pegs;

frangible connector means for initially connecting said bearing members to said flange of said retainer member, said connector means constructed so as to readily fracture upon application of a predetermined force to thereby allow relative rotation between said bearing members and said retainer.

2. An integrally formed bearing and retainer assembly as in claim 1 wherein said frangible connector means includes at least one thin connector arm extending between each said bearing member and said flange of said retainer member.

3. An integrally formed bearing and retainer assembly as in claim 2 wherein each said connector arm is formed by a plurality of apertures located in said flange of said retainer member.

* * * * *